Figure 5:
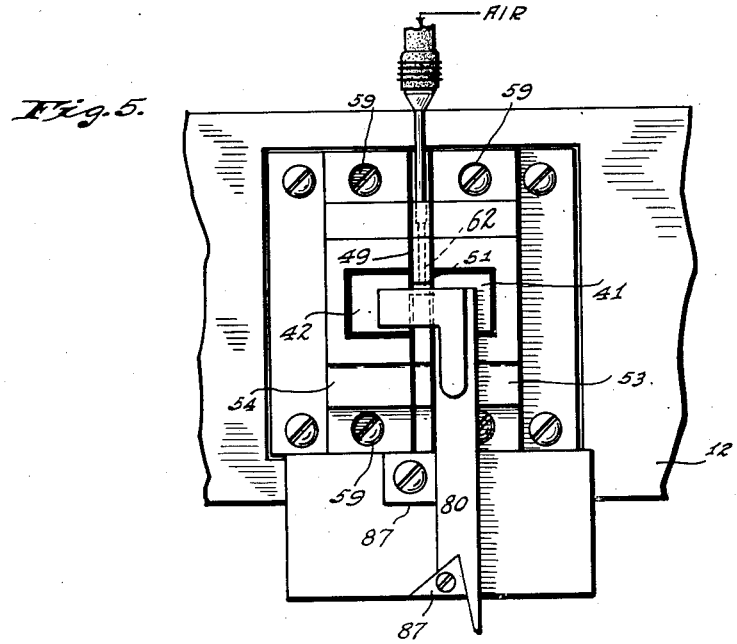

March 12, 1940.   E. R. PIERCY   2,193,770
APPARATUS FOR SPOT-HARDENING
Filed July 5, 1938   2 Sheets-Sheet 1
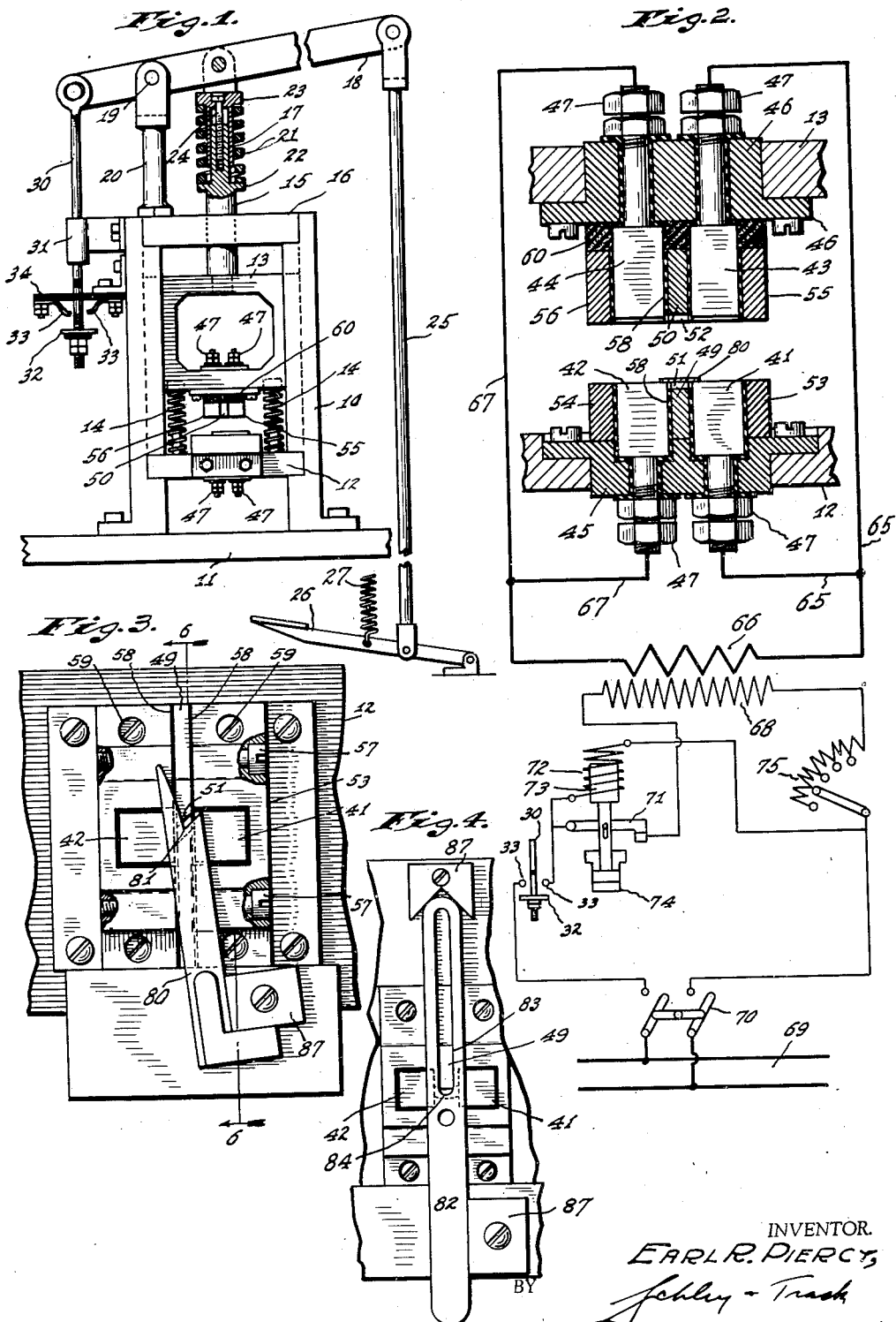
INVENTOR.
EARL R. PIERCY,
BY
ATTORNEYS.

March 12, 1940.　　　　E. R. PIERCY　　　　2,193,770
APPARATUS FOR SPOT-HARDENING
Filed July 5, 1938　　　2 Sheets-Sheet 2

INVENTOR.
EARL R. PIERCY,
BY
ATTORNEYS.

Patented Mar. 12, 1940

2,193,770

UNITED STATES PATENT OFFICE 2,193,770

APPARATUS FOR SPOT-HARDENING

Earl R. Piercy, Indianapolis, Ind., assignor to Thomas & Skinner Steel Products Company, Indianapolis, Ind., a corporation of Indiana Application July 5, 1938, Serial No. 217,420

2 Claims. (Cl. 219—11)

My invention relates to an apparatus for producing hard spots at desired locations in the edges of sheet-steel articles, especially at the edges of openings.

It is the object of my invention to provide such an apparatus by which such hard spots may be produced accurately, inexpensively, and rapidly; especially at the base of an opening between two sheet-steel portions which extend in the same plane from a common base but are spaced apart by such opening.

In general, the spot to be hardened is heated by an electric current caused to pass through it in the plane of the sheet-steel, desirably with the current-filaments concentrated at the spot to be hardened, to heat the spot to a temperature above at least the lower critical temperature of the steel, while the adjacent sheet-steel material is relatively cool; and then that heated spot is quickly cooled, in air if the sheet-steel is sufficiently thin but otherwise in a liquid cooling medium.

The apparatus for doing this has two pairs of electrodes, of which one pair is movable with respect to the other to grip the sheet-steel article between them. The two electrodes of each pair are spaced apart, and each electrode of one pair is connected directly to the mating electrode of the other pair, so that one set of mating electrodes is connected to one side and the other set to the other side of the electric circuit which supplies the heating current.

When the sheet-steel piece in which the hard spot is to be produced is clamped between the two relatively movable pairs of electrodes, it completes the circuit from one set of mating electrodes to the other through the sheet steel; and current is caused to flow momentarily through that circuit, for an interval of time sufficient but desirably just sufficient to produce a rise in temperature at the desired spot to above the lower critical temperature of the steel, while the adjacent sheet-steel material is relatively unheated; and then the current is cut off, desirably automatically, and the steel is cooled to cause a chilling of the heated spot that lay between one set of mating electrodes and the other.

This apparatus is especially effective in producing hard spots in sheet-steel pieces in which between the two portions which are gripped respectively by the two sets of mating electrodes there is an open space that extends part-way but not all the way along the gap between those two electrode-sets; so that the electric current, which cannot jump that open space, is caused to pass around its end and to be concentrated in the sheet-steel at that end.

Figure 6:
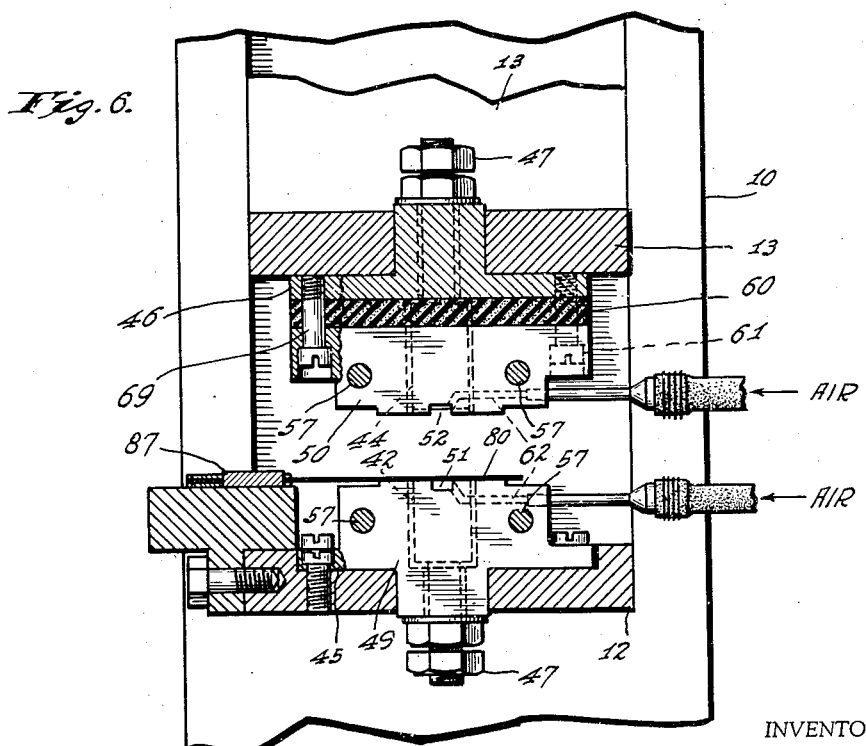

The accompanying drawing illustrates an apparatus embodying my invention and suitable for performing my process. In such drawing, Fig. 1 is a side elevation of such machine, with some parts in section; Fig. 2 is an enlarged section showing the electrodes, and also showing diagrammatically the electrical connections; Figs. 3, 4, and 5 are plan views showing different sheet-steel articles associated with the lower pair of electrodes, for heating spots in such articles when the upper pair of electrodes is brought into operative position and the current is caused to flow, and Fig. 5 in addition shows an air-cooling modification; and Fig. 6 is a fragmental section, generally on the line 6—6 of Fig. 3, but also showing the air-cooling construction of Fig. 5.

A frame 10, mounted on a suitable base 11, has a fixed cross-bar 12 and a vertically movable cross-head 13 above the cross-bar 12. A pair of springs 14 tends to raise the cross-head 13. The cross-head has a stem 15 which extends up through and is guided by the top-piece 16 of the frame 10. Axially movable on the upper end of that stem is a sleeve 17 which is pivotally connected to an operating lever 18, in turn pivotally mounted on a fixed pivot 19 on an upstanding pedestal 20 carried by the frame 10. A coiled compression spring 21 surrounds the sleeve 17 and acts between annular abutments 22 and 23 on the stem 15 and sleeve 17 respectively to tend to push the sleeve 17 upward relatively to the stem 15; but that upward movement is limited by the head of a stop-screw 24 which extends loosely through the top of the sleeve 17 into a threaded hole in the upper end of the stem 15. The spring 21 is more powerful than are the springs 14; so that when the lever 18 is pushed downward to depress the sleeve 17 it also depresses the stem 15 and cross-head 13 at the same time by compressing the springs 14 until the cross-head 15 reaches its lower limit of movement, whereupon farther downward movement of the lever 18 and sleeve 17 compresses the spring 21 without producing farther movement of the stem 15 and cross-head 13.

The operating lever 18 is connected by a link 25 to a pedal 26, and is pulled downward when the pedal 26 is depressed. When the operator releases the pedal 26, the operating lever 18 rises by reason of the action of the springs 14; which may be supplemented if desired, although it is not necessary, by a spring 27, shown as a tension spring, acting on the pedal 26 itself.

The lever 18 has a short end which extends beyond the pedestal 20, and which is connected by a loose pivot to a vertically movable rod 30 suitably guided in a guiding eye 31. The lower end of the rod 30 carries a switch-bar 32, which is moved into and out of engagement with a pair of contacts 33 by the upward and downward movement respectively of the bar 30. The switch-bar 32 is desirably longitudinally adjustable on the rod 30, and is adjusted so that it does not engage the contacts 33 until the downward movement of the pedal 26 has been sufficient to depress the cross-head 30 to the lower limit of its movement; whereupon, by further depressing of the pedal 26 the switch-bar 32 is brought into engagement with the contacts 33 to close an electric circuit to be described hereinafter. The two contacts 33 are insulated from each other, and desirably both are insulated from the frame 10, by being mounted on an insulating bar 34 carried by the frame 10.

The cross-bar 12 carries a pair of fixed electrodes 41 and 42, exposed at their tops, and the cross-head 13 carries a pair of movable electrodes 43 and 44 exposed at their bottoms. The two electrodes of each pair are insulated from each other, as well as from the carrying cross-bar 12 and cross-head 13 respectively, as is clear from Fig. 2. As shown, the electrodes 41 and 42 of the lower pair are set in a plate 45 mounted in but removable from the cross-bar 12, and the electrodes 43 and 44 of the upper pair are set in a plate 46 mounted in but removable from the cross-head 13; and each electrode is provided with a threaded stem which is surrounded by an insulating thimble and extends through its supporting plate and is provided with a pair of clamping nuts 47 for clamping it to said plate. The electrodes are shown as rectangular in cross-section, because that makes for easy construction and insulation; but that rectangular construction is not essential.

The two electrodes of the lower pair are separated by a plate 49, and the two electrodes of the upper pair are separated by a plate 50; and these two plates are provided with notches 51 and 52 respectively opposite each other to provide the location where they do not touch the sheet-metal piece and so where the maximum heating of the sheet-metal piece is produced so that hard spot will be produced at that point. Cooling air may be supplied to the notches 51 and 52 through air-passages 62, conveniently in the separating plates 49 and 50, as shown in Figs. 5 and 6; but this feature is not necessary. The separating plate 49 is clamped between two side plates 53 and 54, and the dividing plate 50 is clamped between two side plates 55 and 56, by screws 57, shown in Fig. 3 for the lower set of plates only; and the side plates 53, 54, 55, and 56 are notched to fit around the respectively associated electrodes 41, 42, 43, and 44. By reason of the rectangular construction, the electrodes may be and are effectively insulated from each other and from the frame of the machine by suitable flat insulating pieces 58.

The group of plates 49, 53, and 54 has its upper surface substantially flush with the upper faces of the electrodes 41 and 42, and is fastened to the removable plate 45 by counter-sunk attaching screws 59. The group of plates 50, 55, and 56 has its under surface normally somewhat lower than the under faces of the electrodes 43 and 44, on which said plates are sufficiently loose to permit some relative vertical movement; and between that group of plates and the plate 46 is a cushion 60 of yieldable material, such as sponge rubber, which permits the group of plates 50, 55, and 56 to move upward relatively to the electrodes 43 and 44 to bring such under surface of that group of plates into the plane of the under face of those electrodes; to permit which relative vertical movement while yet supporting the plates 50, 55, and 56 that group of plates is hung from the removable plate 46 by deeply countersunk attaching screws 61.

As a result of this construction, when the cross-head 13 is depressed, the group of plates 50, 55, and 56 yield upward as may be necessary to produce proper co-operation of the upper and lower electrodes with the intervening sheet-metal material.

The two vertically alined electrodes 41 and 43 which constitute one set are connected by wires 65 to one side of the secondary winding 66 of a step-down transformer, and the other two vertically alined electrodes 42 and 44 which constitute the other set are connected by wires 67 to the other side of that secondary winding 66. The primary winding 68 of that step-down transformer is supplied from a main-line circuit 69 through a main switch 70; but in series therewith through the normally open switch 32—33 and a normally closed but electrically openable switch 71.

The main switch 70 being closed, the closing of the switch 32—33 completes the circuit through the switch 71 and the primary winding 68 of the step-down transformer; but it also completes a shunt circuit through a solenoid 72, to cause the latter to lift its core 73 which is connected through a lost-motion connection to the switch 71, so that that switch 71 will be opened almost immediately after the closing of the aforesaid circuit at the switch 32—33. In this way, a momentary circuit but only a momentary circuit is completed through the transformer; and so the heating secondary current is supplied only momentarily. A dash-pot 74 may be provided by retarding the opening of the switch 71, and a rheostat 75 may be provided for regulating the strength of the primary current and hence of the secondary or heating current.

In operation, the sheet-metal piece in which a hard spot is to be produced is laid on the lower pair of electrodes 41 and 42 in proper position so that the spot which is to be hardened lies over the notch 51 and under the notch 52. Then the pedal 26 is depressed, which causes the lowering of the cross-head 13 to bring the upper pair of electrodes 43 and 44 also into engagement with the sheet-metal piece, during which lowering movement the set of plates 50, 55, and 56 first travel with the electrodes 43 and 44 but stop when they strike the sheet-metal piece while those electrodes continue slightly further downward (by the yielding of the cushion 60) as required to produce that engagement. Until firm engagement is produced of the upper pair of electrodes 43 and 44 on the sheet-metal piece, to clamp such sheet-metal piece between the upper and lower pairs of electrodes, the spring 21 remains substantially uncompressed, and only the springs 14 have yielded; and in addition the switch 32—33 has remained open. When such firm engagement has been obtained, however, the further depression of the pedal 26 causes the spring 21 to be compressed, and during that compression the switch-bar 32 is brought into engagement with the switch contacts 33 to complete the circuit already described.

Upon that completion of the circuit, through the primary winding 68, a secondary current flows through the sheet-metal piece from one set of vertically-alined electrodes 41—43 to the other set of vertically-alined electrodes 42—44; but that secondary current continues only momentarily, because almost immediately the switch 71 is opened to break the primary circuit of the transformer.

During the time the circuit is closed, the secondary current produces an intense heating of the sheet-metal piece at that part thereof which lies between the notches 51 and 52, because that is the only part of the sheet-metal piece that carries the secondary current and that is out of contact with other metal masses which tend to absorb heat. In consequence, a localized heating is produced in the sheet-metal opposite those notches. The timing is such that the local heating in this spot raises the temperature at that spot to a value above at least the lower critical temperature, but the immediate breaking of the circuit causes a quick cooling of that heated spot; which quick cooling is in large measure by the absorption of heat by the surrounding metal parts, although it may be supplemented in any other way, as by air supplied through the air passages 62. This quick cooling is sufficiently rapid to be a definite chilling that produces a hardening of the spot which is heated.

The sheet-metal piece in which a hard spot is produced may be of any desired nature. The sheet-metal piece illustrated in Figs. 1, 2, and 3 is a sinker 80 for knitting machines, and is so placed on the machine that the thread-receiving notch 81 at the toe end of the sinker lies between the notches 51 and 52 of the separator plates 49 and 50 to localize the heating at the base of that notch 81. Additional localization of heating at the base of that notch 81 is obtained by reason of its being a notch, for because of that there is a concentration of current-flow through the sheet-metal at the base of that notch, because the filaments of current which enter the sheet-metal piece at the sides of that notch are compelled to flow around the end of the notch.

The sheet-metal piece in Fig. 4 is a warp drop wire 82 for a loom, and is provided with a slot 83 of which the base 84 is located between the notches 51 and 52 of the separator plates 49 and 50, so that the hard spot will be produced at that slot-base 84. In this warp drop wire 82 there is the additional concentrating of heat at the slot-base 84 by reason of the concentration of current flow at the notch base in the same general manner as there was at the base of the notch 81 of the sinker 80.

In Fig. 5, the sheet-metal piece in which the hard spot is to be produced is also the sinker 80; but here the hard spot is to be produced in the butt edge or heel edge of the sinker, and so it is that butt or heel which is laid between the notches 51 and 52 of the separator plates 49 and 50.

In any of the constructions shown in Figs. 3, 4, and 5, suitable locating members 87 are provided for assisting the operator to locate the sheet-metal piece properly in the machine.

The particular sheet-metal pieces mentioned—the sinker and the warp drop wire—are used merely as illustrations; as spots in many other sheet-metal pieces may be hardened by my process and apparatus.

When air is supplied through the air-passages 62, it may conveniently be continuous; for it will not appreciably interfere with the practically instantaneous heating of the desired spot by the electric current, and in addition the relative movements of the electrodes produces some valving action.

I claim as my invention:

1. A machine for producing a hard spot in a sheet-metal piece, comprising two pairs of electrodes which are relatively movable with respect to each other to receive the sheet-metal piece between them, the two electrodes of each pair being electrical insulated from each other but one electrode of each pair being electrical connected to a substantially alined electrode of the other pair, the two sets of electrical interconnected electrodes being connected to opposite sides of an electrical heating circuit, and a metal separating plate associated with each pair of electrodes and electrical insulated therefrom, said separating plate having a portion in proximity to the sheet-metal piece-receiving surfaces of the electrodes and adapted to be disposed in heat-conducting relationship to a sheet-metal piece adapted to be gripped between said two pairs of electrodes, and at least one of such separating plates having between the two electrodes a notch providing an open space which locates on the sheet-metal piece the spot to be hardened.

2. The invention set forth in claim 1 with the addition that both said plates are provided with notches.

EARL R. PIERCY.